(12) United States Patent
Chien et al.

(10) Patent No.: US 7,463,482 B2
(45) Date of Patent: Dec. 9, 2008

(54) ELECTRONIC APPLIANCE WITH LOCKING MECHANISM

(75) Inventors: Chih-Wei Chien, Taipei Hsien (TW); Yu-Sheng Weng, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/857,451

(22) Filed: Sep. 19, 2007

(65) Prior Publication Data

US 2008/0151509 A1 Jun. 26, 2008

(30) Foreign Application Priority Data

Dec. 22, 2006 (CN) .................. 2006 1 0157879

(51) Int. Cl.
*H05K 5/00* (2006.01)
*H05K 7/00* (2006.01)

(52) U.S. Cl. .................. 361/683; 361/680; 361/681

(58) Field of Classification Search .............. 361/680, 361/681, 63, 683; 70/58, 67, 69–74

See application file for complete search history.

(56) References Cited

U.S. PATENT DOCUMENTS

| | | | |
|---|---|---|---|
| 6,108,196 A | 8/2000 | Jung | |
| 6,115,239 A | 9/2000 | Kim | |
| 6,517,129 B1 * | 2/2003 | Chien et al. | 292/251.5 |
| 6,707,665 B2 * | 3/2004 | Hsu et al. | 361/681 |
| 6,927,972 B1 * | 8/2005 | Wang et al. | 361/683 |
| 6,965,512 B2 * | 11/2005 | Huang et al. | 361/683 |
| 7,164,578 B2 * | 1/2007 | Wang et al. | 361/683 |
| 7,216,900 B2 * | 5/2007 | Liu et al. | 292/98 |
| 7,276,660 B2 * | 10/2007 | Lai et al. | 174/50 |
| 2005/0286215 A1 * | 12/2005 | Yang et al. | 361/683 |
| 2006/0038415 A1 * | 2/2006 | Liu et al. | 292/251.5 |
| 2006/0056140 A1 * | 3/2006 | Lev | 361/683 |

* cited by examiner

*Primary Examiner*—Jayprakash N Gandhi
*Assistant Examiner*—Anthony M Haughton
(74) *Attorney, Agent, or Firm*—Frank R. Niranjan

(57) ABSTRACT

An electronic appliance includes a base defining a receiving opening, a cover pivoted to the base, and a locking mechanism slideably secured to the base next to a guide board for locking the cover to the base. The base forms a guide board in an interior thereof. The cover defines a clasping opening aligned with the receiving opening. The locking mechanism includes a locking hook, a torsion spring, an operating button, and a housing. The housing rotatably secures the locking hook thereon and is engaged with the operating button. The housing is moveable together with the operating button and remains at a first state in which the locking hook is held in the base under cooperative action of the torsion spring and the guide board and a second state in which the locking hook protrudes from the receiving opening to clasp the cover via the clasping opening.

17 Claims, 8 Drawing Sheets

ELECTRONIC APPLIANCE WITH LOCKING MECHANISM

BACKGROUND OF THE INVENTION

1. Field of the Invention

The present invention generally relates to locking mechanisms for electronic appliances, for example portable computers. More particularly, the present invention relates to an electronic device with a locking mechanism with a latch that is hidden when in an unlocked state.

2. Description of Related Art

Portable computers are popular due to their portability and associated conveniences. Typically, a portable computer includes a lid for accommodating a display screen, and a base for housing electronic components, such as a central process unit (CPU), a hard disk, etc. Traditionally, the portable computer uses a locking hook to lock the lid onto the base when the portable computer is not in use. When the lid is unlocked from the base, the hook protrudes from the lid or the base. In this unlocked position, the exposed hook is unattractive and subject to be damaged easily as it protrudes outwardly from the lid or the base.

SUMMARY OF THE INVENTION

According to one aspect, an electronic appliance includes a base defining a receiving opening, a cover pivoted to the base, and a locking mechanism slideably secured to the base next to a guide board for locking the cover to the base. The base forms a guide board in an interior thereof. The cover defines a clasping opening aligned with the receiving opening.

The locking mechanism includes a locking hook, a torsion spring, an operating button, and a housing. The housing rotatably secures the locking hook thereon and is engaged with the operating button. The housing is moveable together with the operating button and remains at a first state in which the locking hook is held in the base under cooperative action of the torsion spring and the guide board and a second state in which the locking hook protrudes from the receiving opening to clasp the cover via the clasping opening.

Other systems, methods, features, and advantages of the present electronic appliance will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present electronic appliance can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe, in detail, the preferred embodiments of the present electronic appliance.

Figure 1:
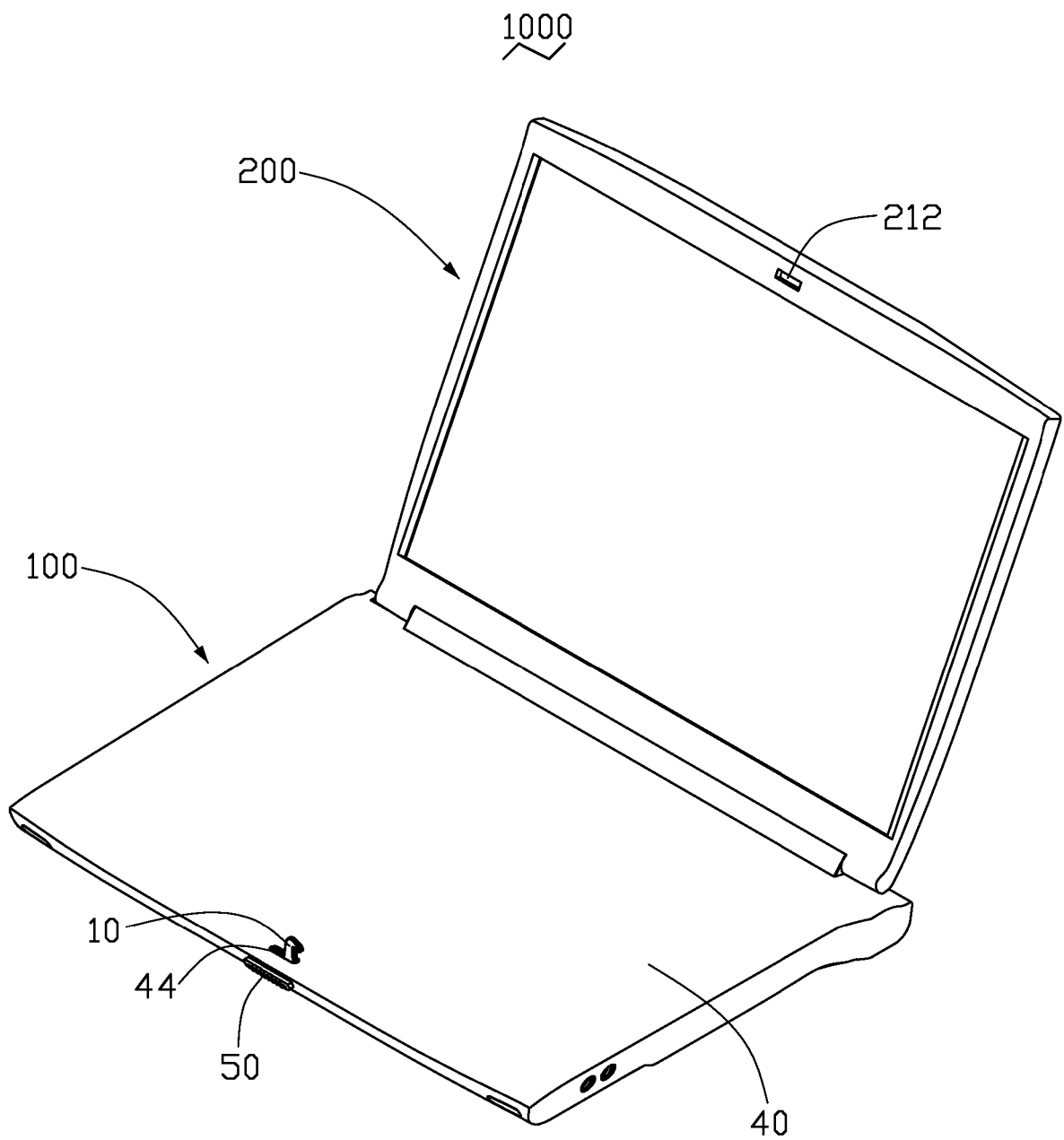
FIG. 1 is an isometric view of an electronic appliance in accordance with an exemplary embodiment, the electronic appliance including a base, a display, and a locking mechanism.
Figure 2:
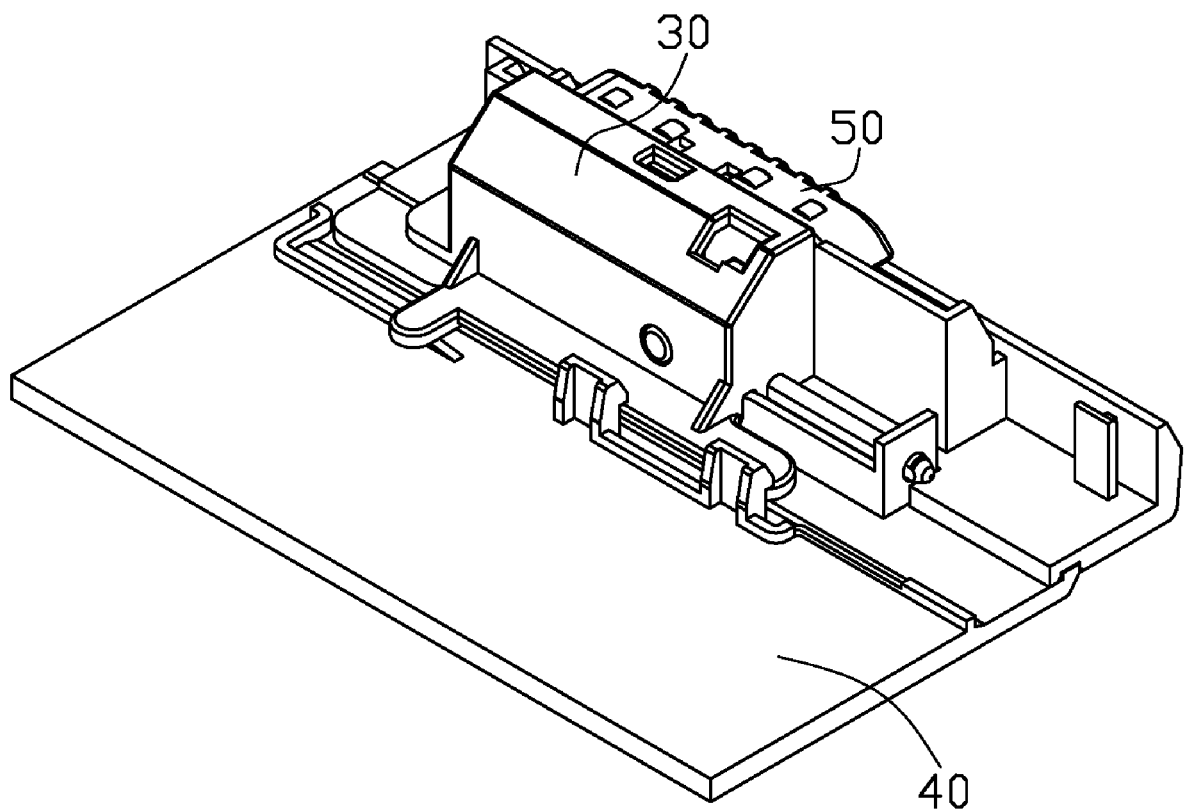
FIG. 2 is an isometric view of the locking mechanism of FIG. 1, viewed from another aspect.

Referring to FIGS. 1 and 2, an electronic device 1000 utilizing a locking mechanism in accordance with an exemplary embodiment is illustrated. The electronic device 1000 includes a base 100 and a display 200 pivotably hinged together. The display 200 rotates about and relative to the base 100. This facilitates the opening and closing of the display 200. The locking mechanism is mounted at a front of the electronic device 1000 to lock the display 200 to the base 100 when the display 100 is closed and to release the display 200 from the base 100 when the display 100 is to be opened. The base 100 defines a receiving opening 44 in a top plate 40 of the base 100. The display 200 defines a locking opening 212 in a base plate of the display 200 facing the base 100.

The base 100 includes a locking hook 10 protrudes from the receiving opening 44, a housing 30, and an operating button 50. The operating button 50 is secured to the housing 30 for slidably moving the housing relative to the top plate 40. The locking hook 10 is rotatably mounted at the housing for cooperatively locking and unlocking the display 200.

Figure 3:
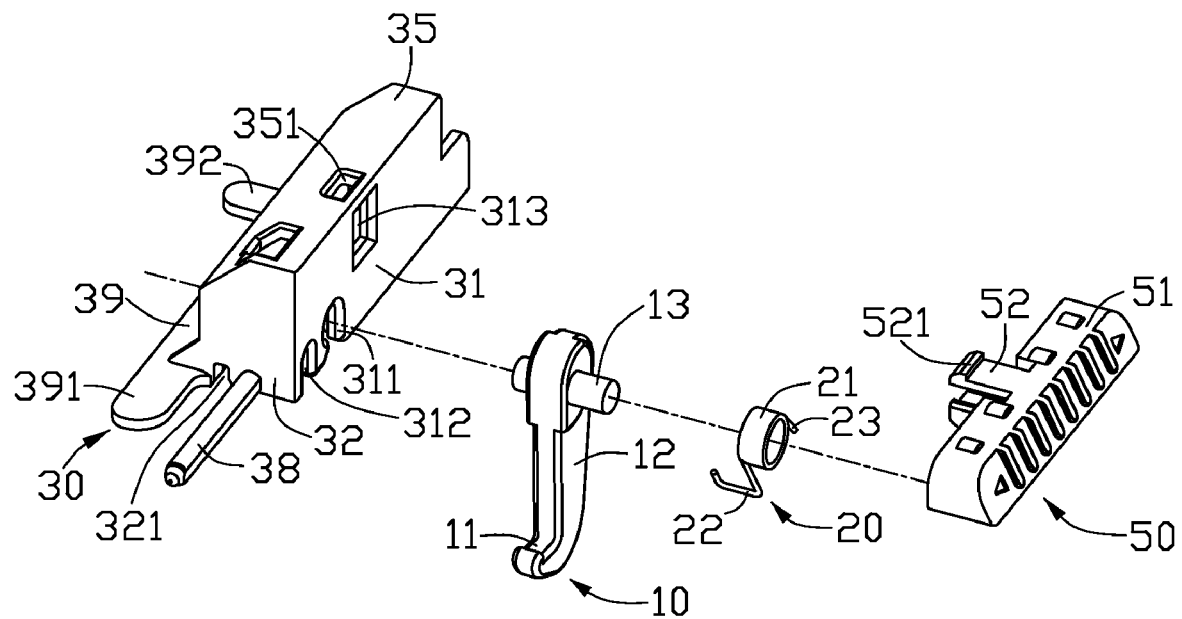
FIG. 3 is an explode, isometric view of the locking mechanism of FIG. 1, the locking mechanism including a locking hook, a torsion spring, a housing, a top plate, and an operating button.
Figure 3:
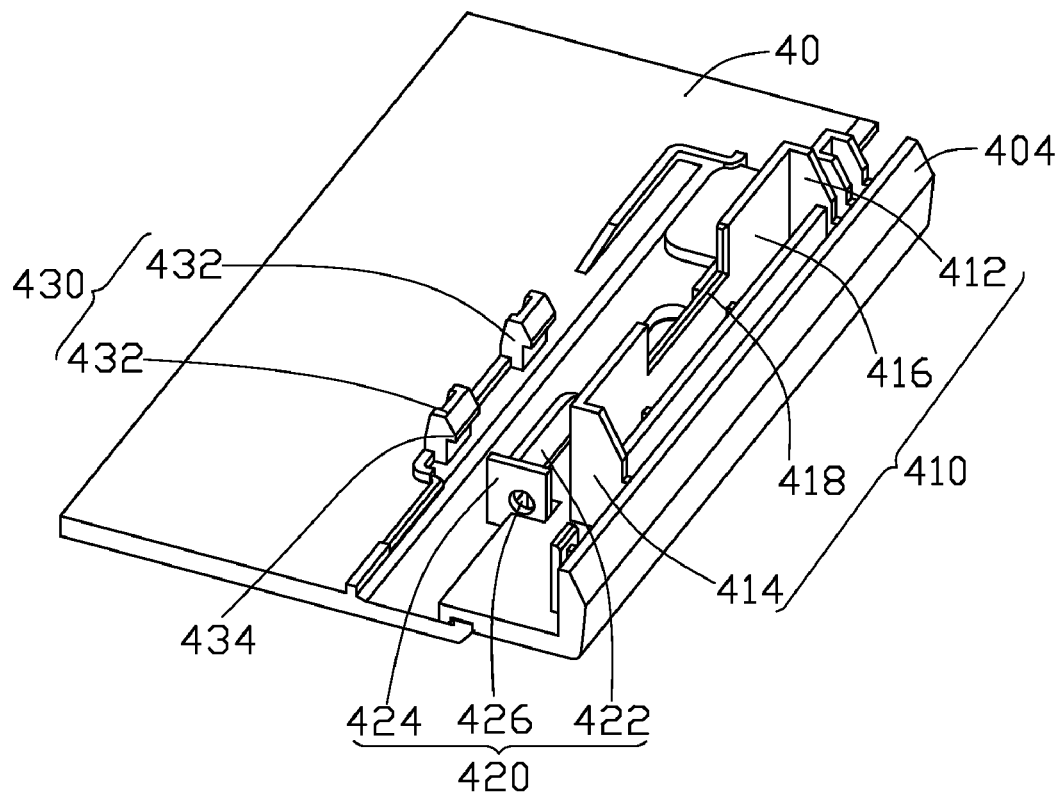
Figure 4:
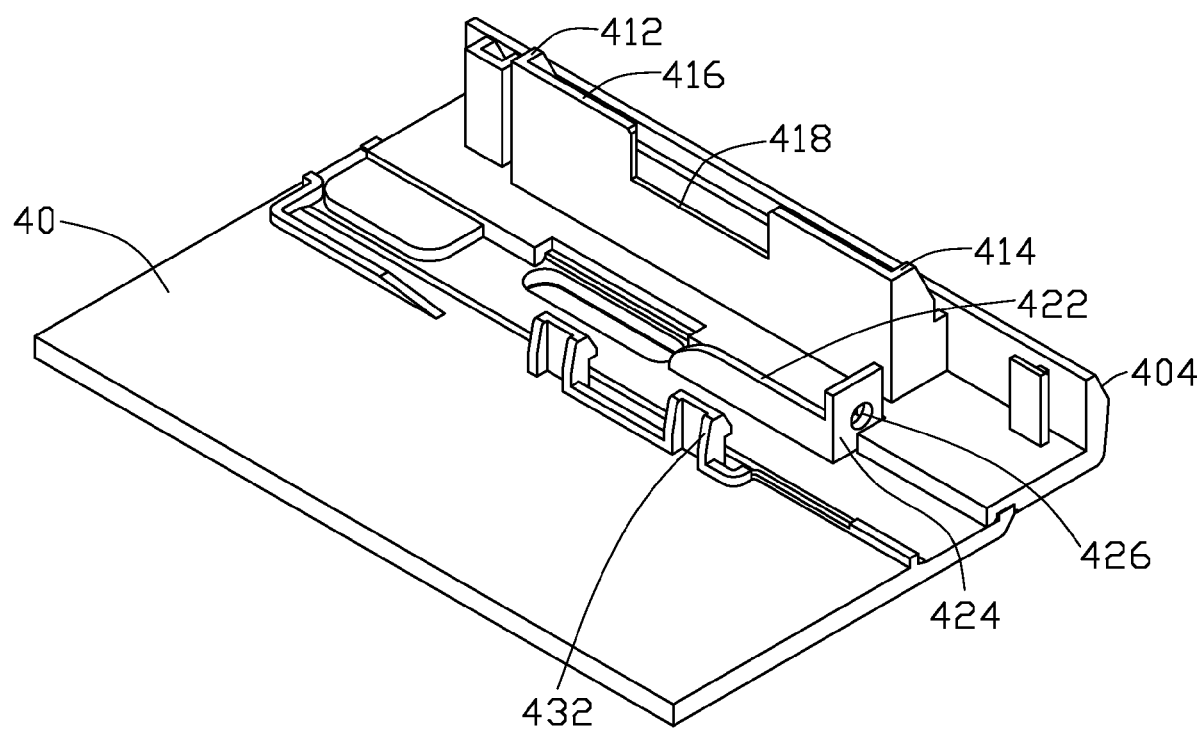
FIG. 4 is an isometric view of the top plate of FIG. 3.

Referring to FIGS. 3 and 4, an inner side of the top plate 40 is shown. The top plate 40 includes a first restriction portion 410, a second restriction portion 420, and a third restriction portion 430. The first, second, and third restriction portions 410, 420, and 430 are arranged in the inner side of the top plate 40 and are parallel to each other.

The first restriction portion 410 includes a first baffle 412, a second baffle 414, and a first guide board 416. The first baffle 412 and the second baffle 414 are parallel to each other and substantially perpendicular to a front flange 404. The front flange 404 extends downward from the front of the top plate 40 of the base 100. A distance between the first baffle 412 and the second baffle 414 is predetermined. The first guide board 416 is substantially parallel to the front flange 404, and connects to both of the first baffle 412 and the second baffle 414. The first guide board 416 defines a cutout 418 at the middle of the first guide board 416. A length of the cutout 418 is predetermined.

The second restriction portion 420 includes a second guide board 422, and a third baffle 424. The second guide board 422 is parallel to, but spaced away from the first guide board 416. The third baffle 424 is parallel to the first baffle 412 and the second baffle 414, and a guide hole 426 is defined in the third baffle 424.

The third restriction portion 430 includes a pair of third guide boards 432. Each third guide board 432 forms a clasp 434 at a free edge of the third guide board 432. The clasp 434 extends from the third guide board 432 toward the second guide board 422.

Figure 5:
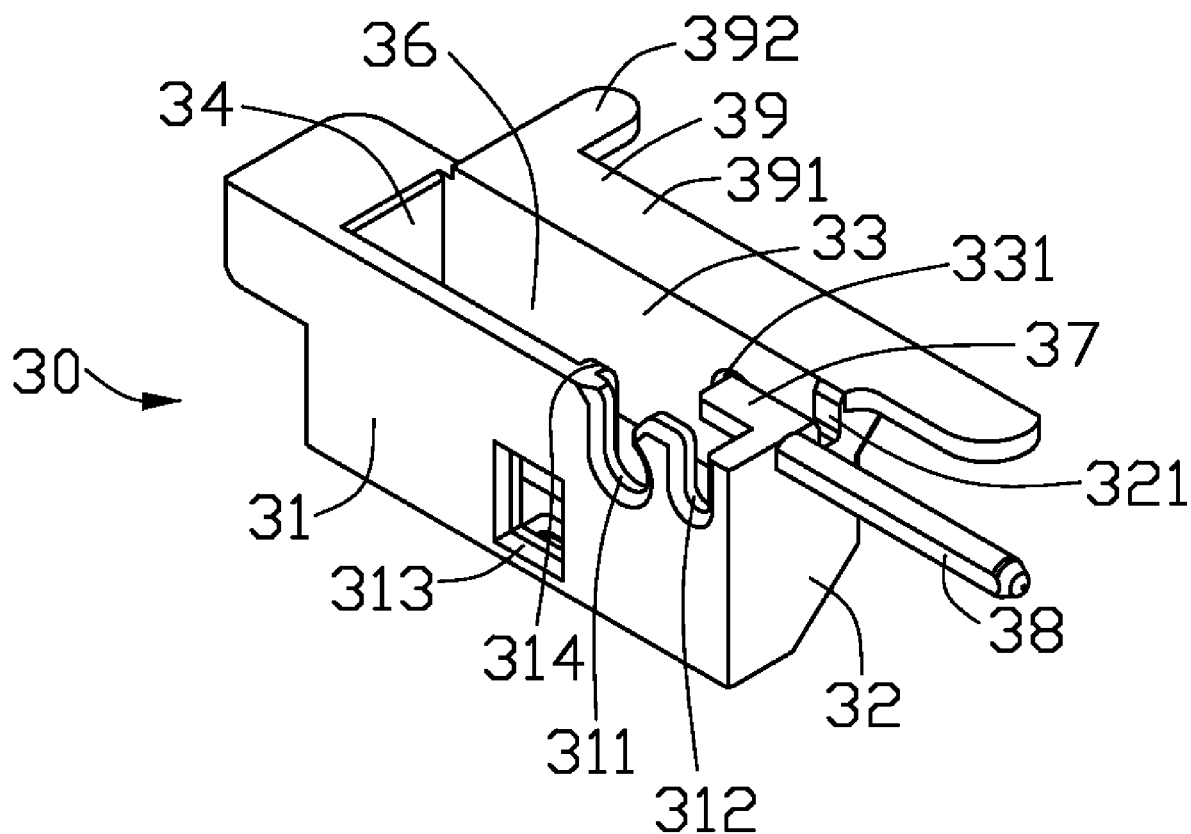
FIG. 5 is an isometric view of the housing of FIG. 3.

Referring to FIG. 3 and FIG. 5, the housing 30 includes a main body constructed by four side walls and a bottom surrounding a hollow 36. A top free edge of a first side wall 31 that is parallel to the first guide board 416 defines an engaging notch 311 and a deforming notch 312, and near to the bottom of the first side wall 31 defines a rectangular opening 313. A pin 38 protrudes along a direction perpendicular to the third baffle 424 from a second side wall 32. The second side wall 32 connects to the first side wall 31 and parallel to the third baffle 424. A receiving notch 321 is defined next to the pin 38. A restriction slice 39 extends from a third side wall 33 that is parallel to the first side wall 31 and communicates with the second side wall 32. The restriction slice 39 is perpendicular to the side walls 31, 32, 33 and includes a guide part 391 and a limiting part 392. The guide part 391 extends at a direction parallel to the third side wall 33. The limiting part 392 extends at a direction perpendicular to the third side wall 33. A round hole 331 is defined in the third side wall 33, corresponding to the engaging notch 311.

Referring back to FIG. 3, the locking hook 10 includes a claw 11 for clasping into the locking opening 212 in the display 200, a hook body 12, and a shaft 13. The claw 11 and the shaft 13 are respectively formed at two ends of the hook body 12. The hook 10 is rotatable around the shaft 13. A torsion spring 20 is sleeved on the shaft 13 to apply a torsion force to the locking hook 10 and makes the locking hook 10 rotate. The torsion spring 20 includes a coil 21, a first end 22, and a second end 23. The first end 22 and the second end 23 respectively extend from two opposite ends of the coil 21.

The operating button 50 includes a main body 51 and two arms 52 extending backward from the main body 51. An end of each arm 52 forms a hamulus 521 extending outside.

When assembling the hook 10 to the housing 30, the torsion spring 20 is first sleeved on the shaft 13 of the hook 10 with the first end 22 of the torsion spring 20 clasping on the hook body 12. The hook 10 together with the torsion spring 20 are in a slanted positioned with an end of the shaft 13 inserted into the round hole 331. Consequently, the other end of the shaft 13 is pushed into the engaging notch 311. The hook 10 is thus rotatably secured to the housing 30. The hook 10 protrudes from the hollow 36 under the action of the torsion spring 20 without any other external force.

After the above procedure, the assembly of the hook 10 and the housing 30 is ready to be assembled into the base 100. The assembly of the hook 10 and the housing 30 slides in a direction parallel to the first guide board 416. When sliding, the pin 38 of the housing 30 enters into the guide hole 426, and the guide part 391 of the restriction slice 39 slides between the second guide board 422 and the third guide boards 432. When the rectangular opening 313 aligns with the cutout 418, the arms 52 of the operating button 50 are inserted into the rectangular opening 313 through the cutout 418. Hereby, assembly of the locking mechanism is accomplished.

Figure 6:
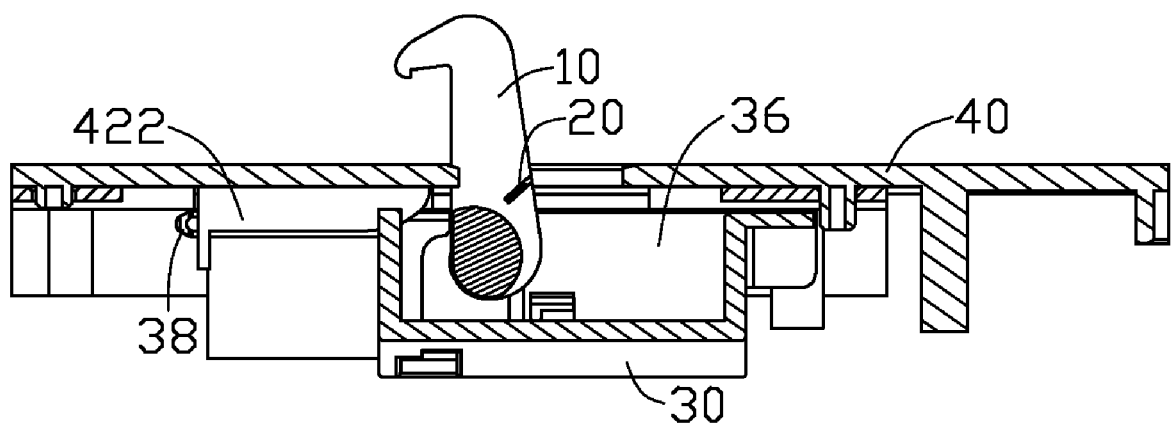
FIG. 6 is a cut-open view of the locking mechanism in a locking state.

Referring to FIG. 6, a locking state of the locking mechanism is shown. The hook 10 protrudes out from the receiving opening 44 in the top plate 40 of the base 100. The first end 22 of the torsion spring 20 applies a torsion force on the hook body 12 to keep the hook 10 in the locking state.

Figure 7:
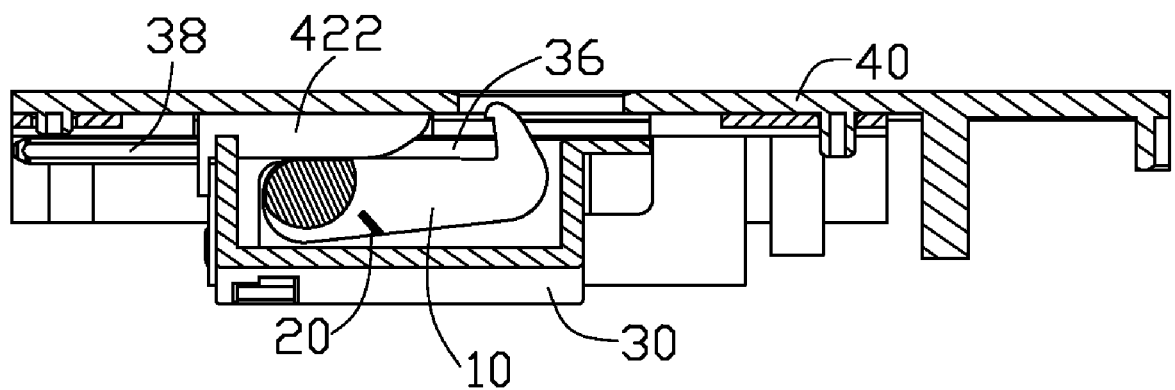
FIG. 7 is a cut-open view of the locking mechanism in an unlocking state.

Referring also to FIG. 7, when the hook 10 changes from the locking state to an unlocking state as shown in FIG. 7, the operating button 50 is pushed to move from the first baffle 412 to the second baffle 414. The housing 30 together with the hook 10 moves from the first baffle 412 to the second baffle 414. The second guide board 422 gradually enters the housing 30 via the receiving notch 321 and simultaneously presses the hook body 12 of the hook 10. When the operating button 50 reaches the second baffle 414, the second guide board 422 presses the hook body 12 to be parallel with the second guide board 422, so that the hook 10 reaches the unlocking state and the hook 10 is hidden in the base 100. The hook 10 keeps in the unlocking state unless the operating button 50 is pushed from the second baffle 414 to the first baffle 412.

When shifting from the unlocking state to the locking state, the operating button 50 is pushed from the second baffle 414 toward the first baffle 412. Accordingly, the hook 10 is moved with the operating button 50, thus a contact area between the hook body 12 and the second guide board 422 decreases and the hook 10 protrudes from the receiving opening 44 gradually. Finally, the hook 10 is pushed to the locking state under the action of the torsion spring 20 and the hook 10 is not pressed by the second guide board 422 any more.

Figure 8:
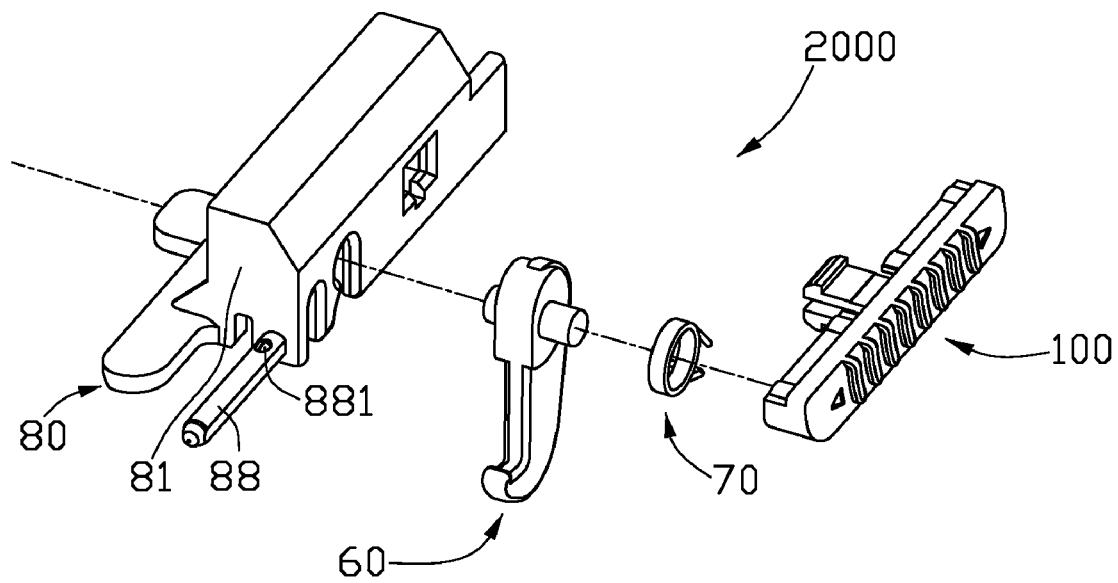
FIG. 8 is an exploded, isometric view of a locking mechanism in accordance with another exemplary embodiment.
Figure 8:
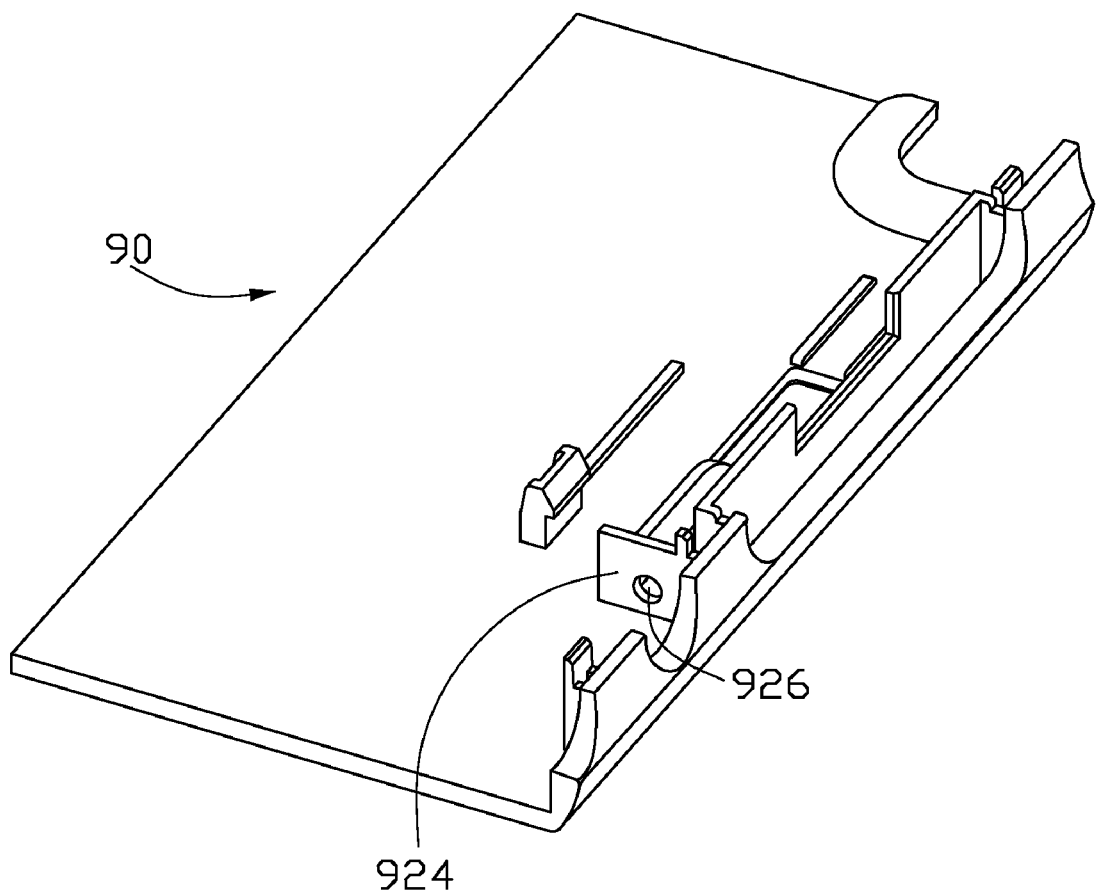

FIG. 8 illustrates the locking mechanism in accordance with another exemplary embodiment. Similar to the first embodiment, the locking mechanism includes a locking hook 60, a torsion spring 70, a housing 80, a base plate 90, and an operating button 100. The locking hook 60, the torsion spring 70, the base plate 90, and the operating button 100 have substantially the same configurations with these in the first embodiment. What is different is that a protrusion 881 is formed on a pin 88 perpendicularly extending from a side wall of the pin 88. The protrusion 881 is near a main body 81 of the housing 80. When the locking mechanism is in the unlocking state, the protrusion 881 passes though a guide hole 926 and is blocked by a third baffle 924 on the base plate 90 as the pin 88 is slightly larger than the guide hole 926 at the section of the protrusion 881. The engagement of the protrusion 881 and the third baffle 924 helps the hook 60 remains in the unlocking state.

The hooks 10, 60 of the locking mechanism are hidden in the base in the unlocking state. It efficiently prevents the hooks from being damaged.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electronic appliance, comprising:
   a base defining a receiving opening, the base forming a guide board in an interior thereof;
   a cover pivoted to the base, the cover defining a clasping opening aligned with the receiving opening; and
   a locking mechanism slideably secured to the base next to the guide board for locking the cover to the base, the locking mechanism comprising:
      a locking hook including a hook body, a claw for clasping the cover, and a shaft for defining a rotating axis of the locking hook, the claw and the shaft extending from two distal ends of the hook body;
      a torsion spring sleeved on the shaft of the locking hook for applying a torsional force onto the locking hook and making the locking hook protrude from the receiving opening;

an operating button being pushable along a pushing direction perpendicular to the rotating axis of the locking hook; and a housing rotatably securing the locking hook thereon and engaged with the operating button, the housing being moveable together with the operating button and remaining at a first state in which the locking hook is held in the base under cooperative action of the torsion spring and the guide board and a second state in which the locking hook protrudes from the receiving opening to clasp the cover via the clasping opening.

2. The electronic appliance as claimed in claim 1, wherein the guide board is formed along the pushing direction of the operating button.

3. The electronic appliance as claimed in claim 2, wherein the guide board presses the hook body of the locking hook through a receiving notch defined in the housing in the first state.

4. The electronic appliance as claimed in claim 3, wherein the guide board shifts away from the hook body of the locking hook in the second state.

5. The electronic appliance as claimed in claim 1, wherein the housing extends a pin along the pushing direction of the operating button, the base defines a guide hole therein, and the pin slides in the guide hole when the locking hook shifts from the first state to the second state or from the second state to the first state.

6. The electronic appliance as claimed in claim 5, wherein a protrusion is formed on the pin, and the protrusion is blocked by the base in the first state.

7. The electronic appliance as claimed in claim 1, wherein the base forms a first baffle and a second baffle perpendicular to the pushing direction for restricting the movement of the operating button between the first baffle and the second baffle.

8. The electronic appliance as claimed in claim 7, wherein a connecting board connecting the first baffle and the second baffle is formed on the base.

9. The electronic appliance as claimed in claim 8, wherein the connecting board defines a cutout therein for allowing arms of the operating button extending therethrough to clasp to the housing.

10. An electronic appliance, comprising:
a base forming a guide board in an interior thereof;
a cover pivoted to the base; and
a locking mechanism slideably secured to the base next to the guide board for locking the cover to the base, the locking mechanism comprising:

a locking hook including a hook body, a claw for clasping the cover, and a shaft for defining a rotating axis of the locking hook, the claw and the shaft extending from two distal ends of the hook body, the rotating axis being perpendicular to the guide board;

a torsion spring sleeved on the shaft of the locking hook for applying a torsional force onto the locking hook and making the locking hook protrude from the base; and a housing rotatably securing the locking hook thereon, the housing being moveable along a moving direction and capable of being remaining at a position where a first moment of the torsion force acted on the locking hook about the rotating axis is equal to a second moment of a pressing force of the guide board acted on the locking hook about the rotating axis and the locking hook is received in base to release the cover from the base.

11. The electronic appliance as claimed in claim 10, wherein the housing defines a receiving notch therein for allowing the guide board to extend therethrough and guiding the movement of the housing.

12. The electronic appliance as claimed in claim 10, wherein the housing extends a pin along the moving direction to extend through a guide hole defined in the base for guiding the movement of the housing.

13. The electronic appliance as claimed in claim 12, wherein a protrusion is formed on the pin, and the protrusion is blocked by the base when the locking hook is received in the base.

14. The electronic appliance as claimed in claim 10, wherein a plurality of clasps is formed on the base to hold the housing to the base.

15. The electronic appliance as claimed in claim 10, wherein the locking mechanism further comprising an operating button engaged with the housing for being applied a pushing force thereon to move the housing along the moving direction.

16. The electronic appliance as claimed in claim 15, wherein the base forms a first baffle and a second baffle perpendicular to the moving direction for restricting the movement of the operating button between the first baffle and the second baffle.

17. The electronic appliance as claimed in claim 10, wherein the connecting board defines a cutout therein for allowing arms of the operating button extending therethrough to clasp to the housing.

* * * * *